March 4, 1930. G. DE BOTHEZAT 1,749,471
HELICOPTER
Filed March 29, 1924 5 Sheets-Sheet 3
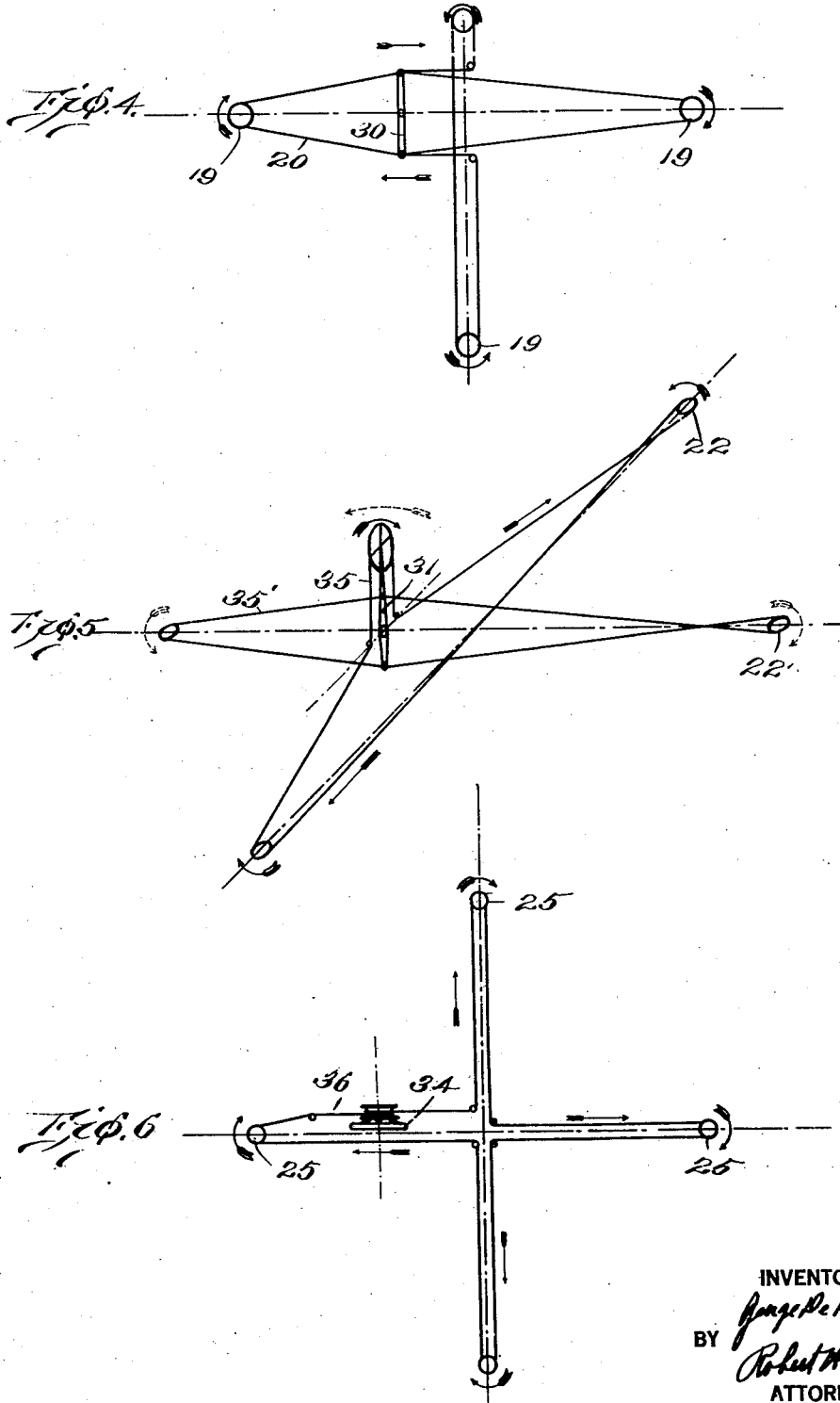

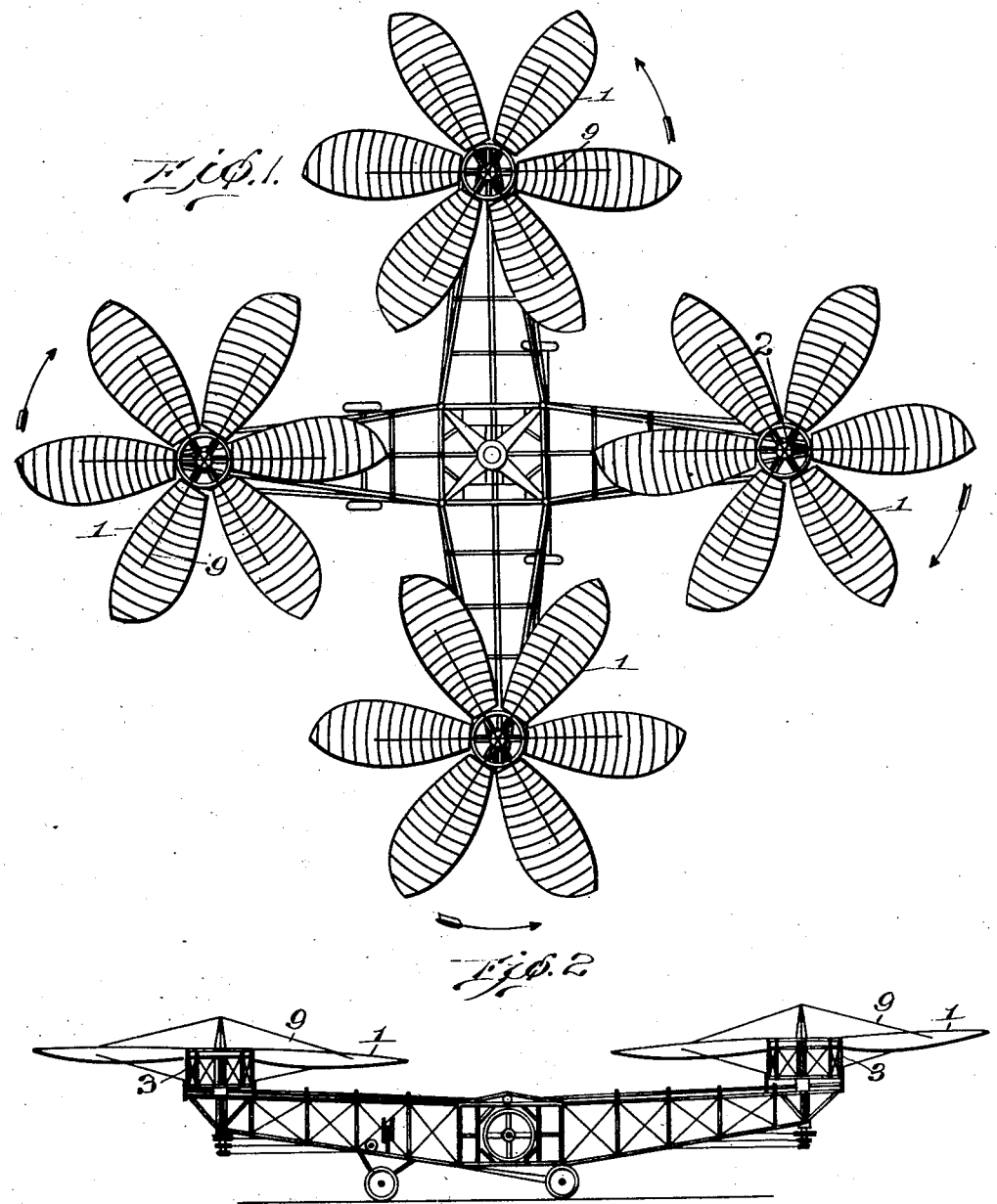

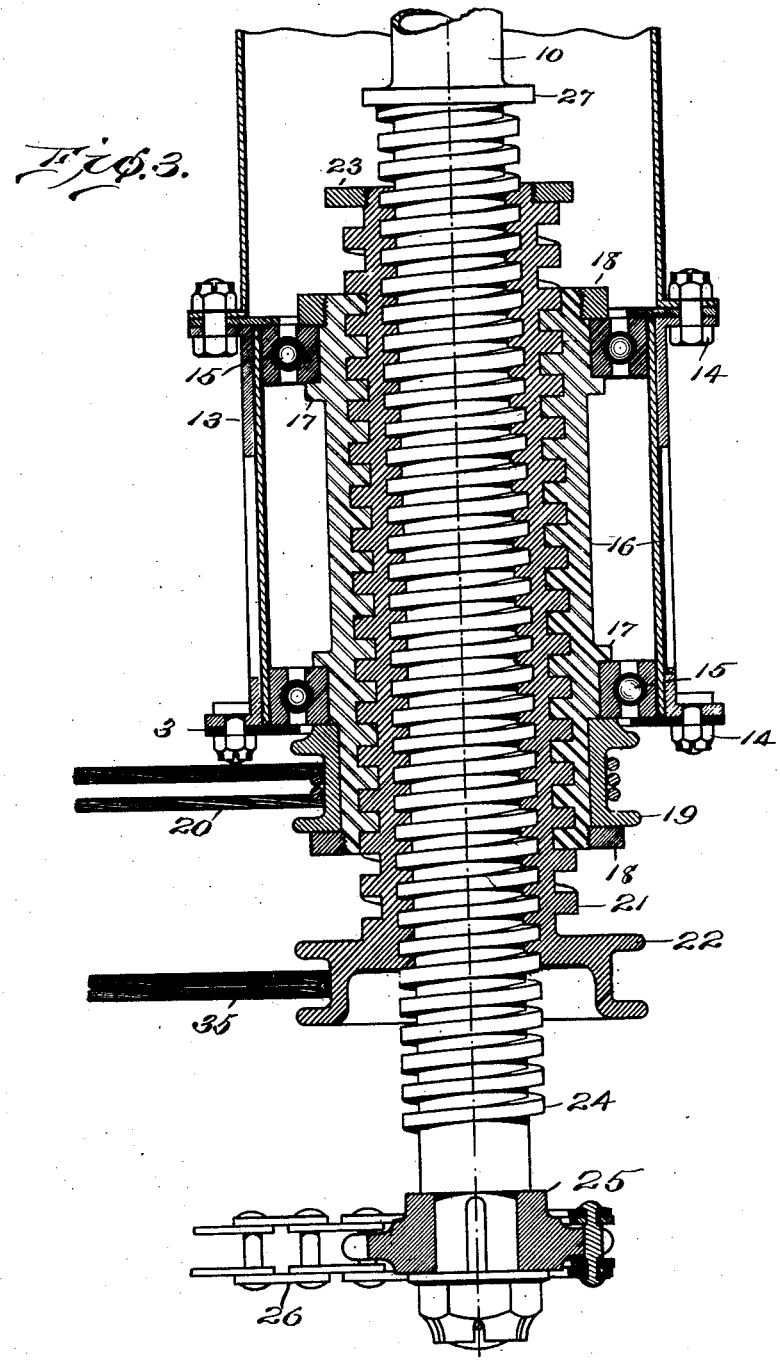

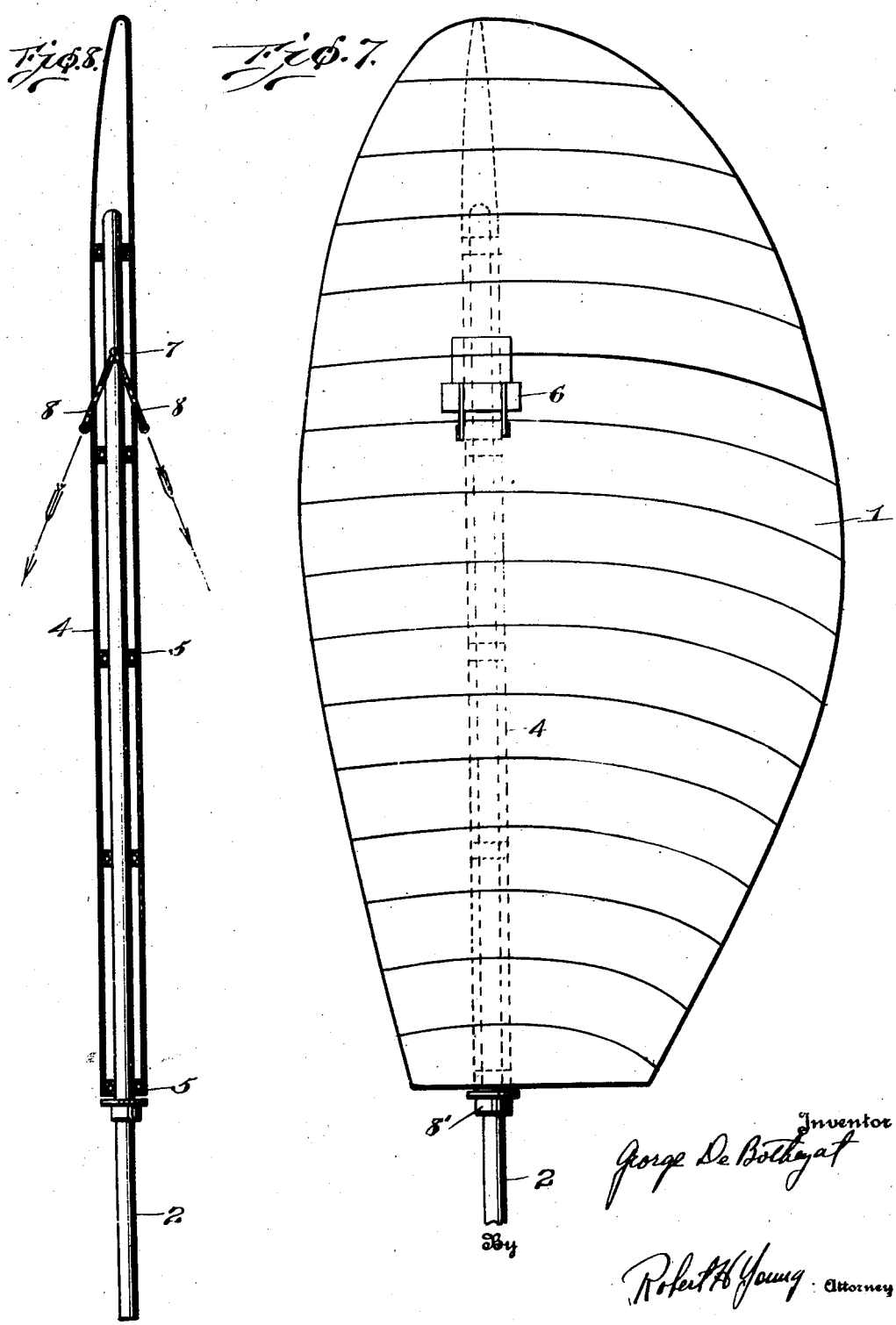

March 4, 1930. G. DE BOTHEZAT 1,749,471
HELICOPTER
Filed March 29, 1924 5 Sheets-Sheet 5
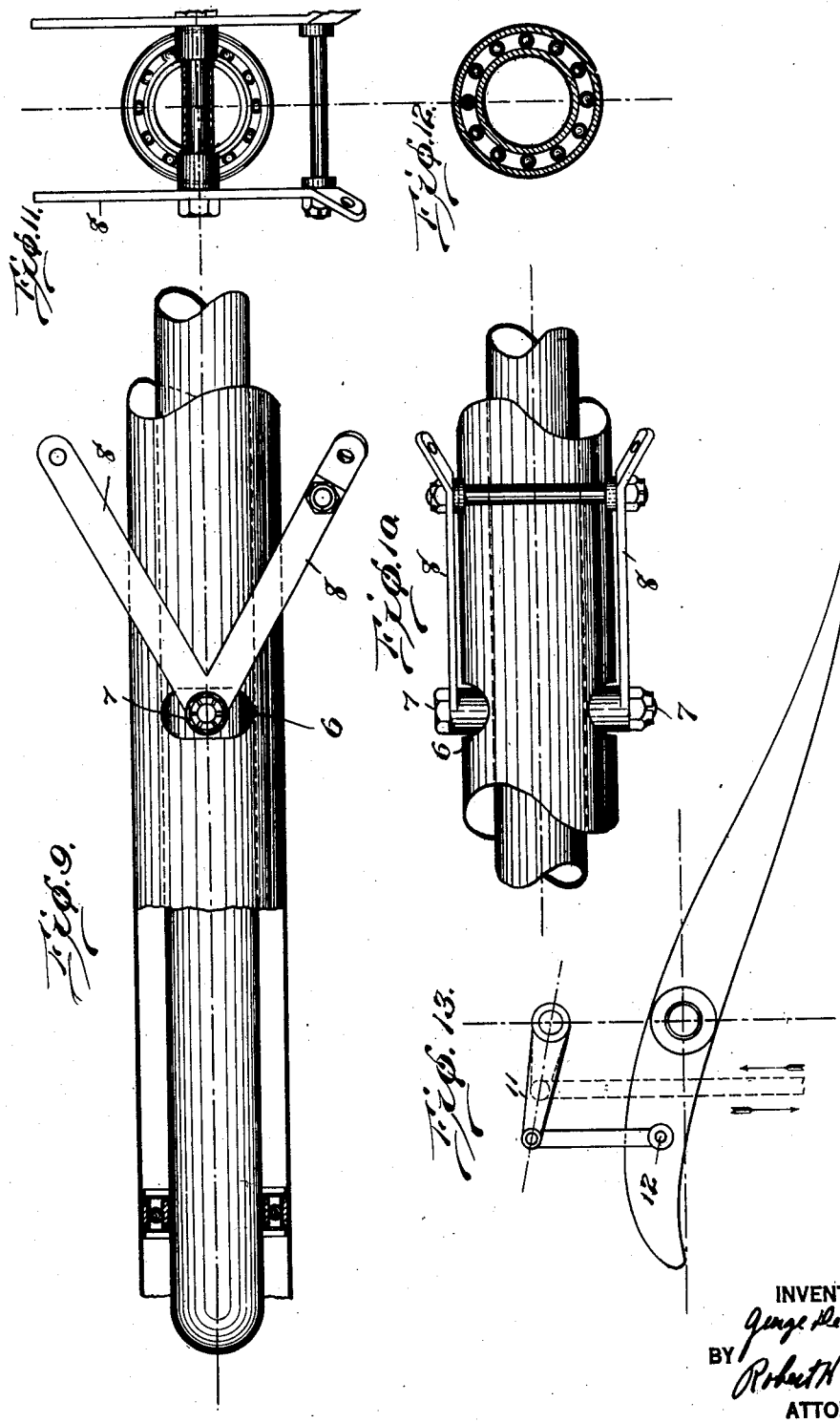
INVENTOR
BY
ATTORNEY Patented Mar. 4, 1930

1,749,471

UNITED STATES PATENT OFFICE

GEORGE DE BOTHEZAT, OF NEW YORK, N. Y.

HELICOPTER

Application filed March 29, 1924. Serial No. 702,871.

This invention relates in general to flying machines of the helicopter type and more especially to improvements in a helicopter equipped with a plurality of lifting propellers symmetrically disposed around the central vertical axis of the machine, structure of such a helicopter being disclosed in my Patent No. 1,573,228.

It is an object of my invention to provide means in my improved device whereby the feature of the double adjustability of the pitches of the lifting propellers as disclosed in my prior application may be amplified to provide for triple adjustability; the added adjustment being provided to control, at will, motion of the machine about its central vertical axis. This construction permits the elimination of the propellers 30 of the device disclosed in my prior application, together with the mechanism incidentally necessary to their operation.

In the device disclosed in my prior application the lifting propellers or blades were rigidly secured to the main spars, the inner ends of which were rotatably mounted in a pair of spaced anti-friction bearings secured to the frame of that group of blades. The reinforcing brace wires or guy wires were secured directly to the main spars. The enormous tension of these wires, especially in view of the small angle between these wires and the spars, resulted in a very considerable thrust being exerted longitudinally of the spars and against the anti-friction bearings. This thrust rendered the operation of the controls to vary the pitches of the propellers comparatively difficult of performance, a very considerable amount of physical effort being necessary to operate the controls.

It is an object of my improved device to provide a structure in which the main spars of the propellers are secured directly and fixedly to the screw frames, and the propellers are mounted on secondary spars concentric with and having anti-friction bearing engagement with the main spar, the guy wires being secured to the main spars through openings in the secondary spars.

It is a further object of my invention to provide a novel type of control means for operating, at will, any of the three controls of my triply adjustable pitch varying mechanism.

Other objects of my invention will appear in the accompanying specification and claims and will be disclosed in the accompanying specification in which—

Figure 1 is a plan view of the general outlines of my assembly.

Figure 2 is a side elevation of the same.

Figure 3 is a detail and central vertical section of my propeller control screw.

Figure 4 is a diagrammatic showing, in plan, of the control means governing movement around the central vertical axis of the machine.

Figure 5 is a diagrammatic showing, in perspective showing the control assembly for governing longitudinal and lateral control.

Figure 6 is a diagrammatic showing, in plan, of my control for simultaneously increasing or decreasing the pitch of all my lifting propellers in like phase.

Figure 7 is a plan view of one of my improved lifting blades, the mounting means being indicated in dotted lines.

Figure 8 is a view shown largely in a vertical section on the line 8—8 of Figure 7.

Figure 9 is an enlarged detail, in plan, with portions broken away and portions sectioned, of a portion of my main and secondary spars, showing the method of fastening the guy wires.

Figure 10 is a side elevation of a portion of the device shown in Figure 9.

Figure 11 is a detail in end elevation of a portion of the device shown in Figure 9.

Figure 12 is a detail in section of the anti-friction bearing for mounting the secondary spar on my main spar.

Figure 13 is a detail of my pitch varying mechanism.

Referring now with greater particularity to the drawings it will be seen that the same general outlines of structure as disclosed in my prior application are used in my improved device; at least four symmetrically disposed propeller assemblies being mounted adjacent the extremities of intersecting frame members or nacelles, the planes of rotations of the propellers being disposed at angles to each other and converging inwardly and downwardly toward the central vertical axis of the machine to provide for inherent stability; the engine or prime mover is similarly mounted and the gear train mechanism is substantially unchanged. The propellers 30 of my earlier device have been dispensed with; the nacelles have been made substantially trapezoidal in cross section rather than triangular as in the earlier device, to give greater rigidity against weaving stresses; the brake has been omitted and new control means and propeller mounting means have been provided as will now be described in detail. The lifting propellers 1 are all mounted in identically the same manner, a main spar 2, fixedly secured to the nacelle 3, being provided for each; the propellers being fixedly connected to hollow secondary spars 4 mounted concentrically of and rotatably on the main spars, antifriction bearings 5 being provided between said spars. The spars 4 are provided with laterally extending elongated openings 6 to permit the insertion of bolts 7 for fixedly securing the upper and lower guy wire fittings 8 to the main spars 2. The elongation of the opening 6 permits of relative rotation between the main and the auxiliary spars. The guy wires 9 are adapted to extend from the fittings 8 to the nacelle 3. The pitch of the blades of each propeller is to be varied by means of a vertically extending shaft 10— adapted to be moved vertically by a control mechanism as will be described hereinafter,— and linkage 11 mounted on said shaft secured to the blade at 12.

Having reference now especially to Figure 3, the operation of my triply adjustable pitch varying mechanism will be described. A mechanism such as is shown in Fig. 3 is suitably mounted in each propeller frame and takes the place of the doubly adjustable screw in my prior application above referred to.

The casing 13 is adapted to be secured to the nacelle 3 by suitable means such as bolts 14. Spaced anti-friction bearings 15 are fixedly mounted in said casing and are adapted to rotatably bear my triple screw assembly. An outer screw member 16 is interiorly screw-threaded and is provided exteriorly with flanges 17 and screw-threaded collars 18 adapted to clamp the said screw against movement vertically with respect to said casing. A pulley 19 is fixedly secured to the screw member 16 and is adapted to be rotated by any suitable means, such as cable 20. An intermediate screw member 21 is both interiorly and exteriorly screw-threaded and is adapted to be mounted in the bore of and to screw-threadedly engage with outer screw member 16. A pulley 22 is formed integrally with screw member 21 and is of such diameter as to limit upward vertical movement of the screws 21 relatively to the screw 16. A screw-threaded collar 23 is provided to limit downward movement of member 21. A cable 35 is adapted to be utilized to rotate pulley 22. An inner screw member 24 comprising the lower portion of the rod or shaft 10, is mounted in the bore of member 21 and is provided with exterior screw threads for screw-threaded engagement with the same. A sprocket 25 is fixedly secured to the lower end of the member 24, the sprocket and hence the member 24 being adapted to be rotated by means of a chain 26. A flange 27 and the sprocket 25 serve to limit movement of member 24 vertically with respect to member 21.

From the foregoing description it will be seen that the outer, inner, and intermediate screw members can be rotated singly, in pairs, or all in unison. The rotation of the screw member 16 alone, fixed as it is against vertical movement, will result in vertical movement of the members 21 and 24; rotation of member 21 alone will result in vertical movement of the inner screw member 24; rotation of member 24 alone will result in its being moved vertically. Obviously a larger number of combinations of rotations of the three members, in the same or in opposite directions, and to the same or unequal degrees is possible with a resulting larger number of vertical movements in both directions transmitted to the blade adjusting rod 10.

Referring now especially to Figures 4, 5 and 6, my control system will be explained. In Figure 4 I have shown a foot bar control 30 to which cables 20 are secured in such a manner that motion of the foot bar will rotate one pair of diametrically opposed pulleys 19 in one direction and the other pair of pulleys 19 oppositely. This will result in simultaneous vertical movements of the rods 10 of the lifting propellers with an increase of pitch in one pair of diametrically opposed lifting propellers and an equal decrease in pitch of the other pair. The total thrust of the four lifting propellers will not be changed by this maneuver but the torques will be unbalanced with the result that the machine will be turned about its central vertical axis.

In Figure 5 I have shown a stick-and-wheel control means 31 for controlling the machine around its lateral and longitudinal axes. One cable 35 is adapted to be actuated by rotational movement of the wheel control to rotate oppositely the pulleys 22 of one pair of diametrically opposed lifting propellers, with the resultant increase of the pitch of one of said propellers and a simultaneous and equal decrease of the opposed propeller. This provides for lateral control of the craft. The other cable 35' is secured to the stick and adapted to be actuated by the fore and aft movement thereof, to rotate the other pair of pulleys 22' oppositely simultaneously and equally to provide, similarly, fore and aft control of the craft.

In the movements of the control shown in Figure 5, it will be noted that the torque remains balanced, and the total thrust remains constant.

In Figure 6 I have disclosed a control means in the form of a hand wheel 34 conveniently located for operation by the pilot,—preferably disposed on the inner side wall of the nacelle—and connected by means of chains 36 to sprockets 25 in such a manner that rotation of the hand wheel 34 will result in simultaneous and equal rotation of the four sprockets in the same direction. This will result in the equal and simultaneous increase or decrease of pitch of all the lifting propellers. This control is used in ascending and descending.

My device having been described in detail it will be seen that I have provided control means for controlling the helicopter about its three axes, the control levers being of the instinctively operated type familiar in aircraft and each movement of the control means controls exactly the same phase of stabilization as in the more familiar types of aircraft. Additionally, I have provided a novel and improved mounting means for my lifting propellers such that a minimum of friction will be offered to the operation of the pitch varying mechanism.

While I have disclosed my device in comparative detail, it is to be clearly understood I do not wish to restrict myself to the exact mechanism shown herewith as it is obvious that many and diversified forms of structure may be used to accomplish the same results as contemplated in my inventive idea and as covered in the following claims. One of such changes in structure might readily be a provision of a greater number of groups of lifting propellers, it being essential only that such propellers shall be mounted in opposed pairs and symmetrically disposed with relation to the longitudinal and lateral axes of the craft.

Obviously, when six or eight or a greater number of propellers are so used suitable provisions may be made for varying at will the controlling effects on the various pairs of propellers. The pitch of certain comparatively centrally located propellers may be well kept constant or may be operated only by the control which simultaneously increases or decreases the pitch of all propellers while the control around the vertical axis and about the longitudinal axis may be governed by varying the pitch of the propellers on the opposite side more suitably located for this purpose at a distance from the centrally located pairs.

I claim:

1. In a helicopter flying machine, a plurality of pairs of lifting propellers mounted on the frame of said machine, and symmetrically disposed about the central vertical axis thereof, and means for unbalancing the torque of said propellers while maintaining the total thrust constant for the purpose described.

2. In a helicopter flying machine, a plurality of lifting propellers of variable pitch mounted on said machine, and symmetrically disposed in diametrically opposed pairs thereon, the propellers of one pair rotating in the same direction and in a direction opposite to the direction of rotation of the other pair, and means for increasing the pitch of one pair of diametrically opposed propellers and simultaneously and correspondingly decreasing the pitch of the other pair of propellers for the purpose described.

3. In a helicopter flying machine, a plurality of lifting propellers of variable pitch mounted on said machine and symmetrically disposed in diametrically opposed pairs thereon, means for increasing the pitch of one pair of diametrically opposed propellers and simultaneously and correspondingly decreasing the pitch of the other pair of propellers to rotate the machine about its central vertical axis, and control means pivoted to move in a horizontal plane and adapted to actuate said means.

4. In combination, in a helicopter flying machine, a plurality of lifting propellers of variable pitch mounted on the frame of said machine and symmetrically disposed in diametrically opposed pairs about the central vertical axis thereof, means for unbalancing the thrust of the propellers of either diametrically opposed pairs while maintaining the total torque of said propellers constant, and means for unbalancing the torque of the lifting propellers of said machine.

5. In combination, in a helicopter flying machine, a plurality of lifting propellers of variable pitch mounted on the frame of said machine, and symmetrically disposed in diametrically opposed pairs about the central vertical axis thereof, means for unbalancing at will the thrust of the propellers of either, or both, diametrically opposed pairs while maintaining the total torque of said pairs constant, and means for unbalancing the torque of the lifting propellers of said machine.

6. In combination, in a helicopter flying machine, a plurality of lifting propellers of variable pitch mounted on the frame of said machine and symmetrically disposed in diametrically opposed pairs about the central vertical axis thereof, means for unbalancing at will the thrust of the propellers of either, or both diametrically opposed pairs while maintaining the total torque of said pairs constant, means for unbalancing the torque of the lifting propellers of said machine, and instinctively operated control means for operating both of said means.

7. In combination, in a helicopter flying machine, a plurality of pairs of lifting propellers of variable pitch mounted on the frame of said machine and symmetrically disposed in diametrically opposed pairs about the central vertical axis thereof, means for increasing the pitch of one of the propellers of one of the diametrically opposed pairs of propellers, and simultaneously and equally decreasing the pitch of the other of said propellers, and means for unbalancing the torque of the lifting propellers of said machine.

8. In combination, in a helicopter flying machine, a plurality of lifting propellers of variable pitch mounted on the frame of said machine and symmetrically disposed in diametrically opposed pairs about the central vertical axis thereof, means for increasing, at will, the pitch of one of the propellers of either or both pairs of diametrically opposed propellers and simultaneously and equally decreasing the pitch of the other propellers of the opposed pairs, and means for increasing the pitch of both propellers of one of the diametrically opposed pairs of propellers while simultaneously and equally decreasing the pitch of both the propellers of the other diametrically disposed pair.

9. In combination, in a helicopter flying machine, a plurality of lifting propellers of variable pitch mounted on the frame of said machine and symmetrically disposed in diametrically opposed pairs about the central vertical axis thereof, means for increasing, at will, the pitch of one of the propellers of either or both pairs of diametrically opposed propellers and simultaneously and equally decreasing the pitch of the other propellers of the opposed pairs, and means for increasing the pitch of the propellers of one of the diametrically opposed pairs of propellers while simultaneously and equally decreasing the pitch of the propellers of the other diametrically disposed pair, the two means being capable of movement both differentially and additively with respect to each other.

10. In combination, in a helicopter flying machine, a plurality of lifting propellers of variable pitch mounted on the frame of said machine and symmetrically disposed in diametrically opposed pairs about the central vertical axis thereof, means for increasing, at will, the pitch of one of the propellers of either or both pairs of diametrically opposed propellers and simultaneously and equally decreasing the pitch of the other propellers of the opposed pairs, means for increasing the pitch of the propellers of one of the diametrically opposed pairs of propellers while simultaneously and equally decreasing the pitch of the propellers of the other diametrically disposed pair, and instinctively operated control means for operating both of said means.

11. In combination, in a helicopter flying machine, a plurality of lifting propellers of variable pitch mounted on the frame of said machine and symmetrically disposed in diametrically opposed pairs about the central vertical axis thereof, means for increasing, at will, the pitch of one of the propellers of either or both pairs of diametrically opposed propellers and simultaneously and equally decreasing the pitch of the other propellers of the opposed pairs, means for increasing the pitch of the propellers of one of the diametrically opposed pairs of propellers while simultaneously and equally decreasing the pitch of the propellers of the other diametrically disposed pair, the two means being capable of movement differentially with respect to each other, and instinctively operated control means for operating both of said means.

12. In combination, in a helicopter flying machine, a plurality of lifting propellers of variable pitch mounted on the frame of said machine and symmetrically disposed in diametrically opposed pairs about the central vertical axis thereof, means for increasing the pitch of one of the propellers of one of the diametrically opposed pairs of propellers, and simultaneously and equally decreasing the pitch of the other of said propellers, means for unbalancing the torque of the lifting propellers of said machine, and means for simultaneously and equally increasing or decreasing the pitch of all of said lifting propellers.

13. In combination, in a helicopter flying machine, a plurality of lifting propellers of variable pitch mounted on the frame of said machine and symmetrically disposed in diametrically opposed pairs about the central vertical axis thereof, means for increasing the pitch of one of the propellers of one of the diametrically opposed pairs of propellers, and simultaneously and equally decreasing the pitch of the other of said propellers, means for unbalancing the torque of the lifting propellers of said machine, and means for simultaneously and equally increasing or decreasing the pitch of all of said lifting propellers, the three means being capable of movement differentially with respect to each other.

14. In combination, in a helicopter flying machine, a plurality of lifting propellers of variable pitch mounted on the frame of said machine and symmetrically disposed in diametrically opposed pairs about the central vertical axis thereof, means for increasing the pitch of one of the propellers of one of the diametrically opposed pairs of screws, and simultaneously and equally decreasing the pitch of the other of said propellers, means for unbalancing the torque of the lifting propellers of said machine, means for simultaneously and equally increasing or decreasing the pitch of all of said lifting propellers, the three means being capable of movement differentially with respect to each other, the first named two means being operated by instinctively operated controls.

15. In a helicopter flying machine, a plurality of lifting propellers each comprised of a plurality of propeller blades of variable pitch, a main spar for each propeller blade rigidly secured to the hub of said propeller, a secondary spar fixedly secured to said propeller and rotatably mounted on said main spar, brace members for said spar secured at thier inner ends to the hub frame of said propeller and at their outer ends to fittings fixedly secured to the main spar, said fittings extending outwardly through an elongated opening in said secondary spar, and means for rotating said propeller blade on said main spar.

16. In a helicopter flying machine, a lifting propeller blade pitch varying operating member comprising an outer screw, an inner screw, one of said screws being fixedly secured against vertical movement, means for securing the other of said screws to said lifting propeller blade, an intermediate screw screw-threadedly engaging said outer screw and said inner screw, and means for rotating said screws.

17. In a helicopter flying machine, a lifting propeller blade pitch varying operating member comprising an outer screw, an inner screw, one of said screws being fixedly secured against vertical movement, means for securing the other of said screws to said lifting propeller blade, an intermediate screw screw-threadedly engaging said outer screw and said inner screw, and means for rotating said screws at will, singly, in pairs, or in unison in the same direction or in opposite directions to the same or varying degrees.

18. In a helicopter flying machine, a plurality of lifting propellers of variable pitch mounted on said machine, and symmetrically disposed in diametrically opposed pairs thereon, the planes of rotation of said propellers converging inwardly and downwardly, the propellers of one pair rotating in the same direction and in a direction opposite to the direction of rotation of the other pair, and means for increasing the pitch of one pair of diametrically opposed propellers and simultaneously and correspondingly decreasing the pitch of the other pair of propellers for the purpose described.

19. In a helicopter flying machine, a plurality of lifting propellers of variable pitch mounted on said machine and symmetrically disposed in diametrically opposed pairs thereon, the planes of rotation of said propellers converging inwardly and downwardly, means for increasing the pitch of one pair of diametrically opposed propellers and simultaneously and correspondingly decreasing the pitch of the other pair of propellers to rotate the machine about its central vertical axis, and control means pivoted to move in a horizontal plane and adapted to actuate said means.

20. In combination, in a helicopter flying machine, a plurality of lifting propellers of variable pitch mounted on the frame of said machine and symmetrically disposed in diametrically opposed pairs about the central vertical axis thereof, the planes of rotation of said propellers converging inwardly and downwardly, means for unbalancing the thrust of the propellers of either diametrically opposed pairs while maintaining the total torque of said propellers constant, and means for unbalancing the torque of the lifting propellers of said machine.

21. In combination, in a helicopter flying machine, a plurality of lifting propellers of variable pitch mounted on the frame of said machine, and symmetrically disposed in diametrically opposed pairs about the central vertical axis thereof, the planes of rotation of said propellers converging inwardly and downwardly, means for unbalancing at will the thrust of the propellers of either, or both, diametrically opposed pairs while maintaining the total torque of said pairs constant, and means for unbalancing the torque of the lifting propellers of said machine.

22. In combination, in a helicopter flying machine, a plurality of lifting propellers of variable pitch mounted on the frame of said machine and symmetrically disposed in diametrically opposed pairs about the central vertical axis thereof, the planes of rotation of said propellers converging inwardly and downwardly, means for unbalancing at will the thrust of the propellers of either or both diametrically opposed pairs while maintaining the total torque of said pairs constant, means for unbalancing the torque of the lifting propellers of said machine, and instinctively operated control means for operating both of said means.

23. In combination, in a helicopter flying machine, a plurality of lifting propellers of variable pitch mounted on the frame of said machine and symmetrically disposed in diametrically opposed pairs about the central vertical axis thereof, the planes of rotation of said propellers converging inwardly and downwardly, means for increasing the pitch of one of the propellers of one of the diametrically opposed pairs of screws, and simultaneously and equally decreasing the pitch of the other of said propellers, and means for unbalancing the torque of the lifting propellers of said machine.

24. In combination, in a helicopter flying machine, a plurality of lifting screws of variable pitch mounted on the frame of said machine and symmetrically disposed in diametrically opposed pairs about the central vertical axis thereof, the planes of rotation of said propellers converging inwardly and downwardly, means for increasing, at will, the pitch of one of the screws of either or both pairs of diametrically opposed screws and simultaneously and equally decreasing the pitch of the other screws of the opposed pairs, and means for increasing the pitch of both screws of one of the diametrically opposed pairs of screws while simultaneously and equally decreasing the pitch of both the screws of the other diametrically disposed pair.

In testimony whereof I affix my signature.

GEORGE DE BOTHEZAT.